United States Patent

Murphy et al.

Patent Number: 6,164,333
Date of Patent: Dec. 26, 2000

[54] CONVECTION HEAT TRAP

[75] Inventors: Mark A. Murphy, Nashville; Wesley O. Dunn, Mt. Juliet, both of Tenn.

[73] Assignee: APCOM, Inc., Franklin, Tenn.

[21] Appl. No.: 09/264,845

[22] Filed: Mar. 2, 1999

[51] Int. Cl.[7] .................................................. F16K 15/00
[52] U.S. Cl. ....................................... 137/855; 137/493.9
[58] Field of Search ............................. 137/493.9, 515.7, 137/855; 138/44

[56] References Cited

U.S. PATENT DOCUMENTS

| | | | |
|---|---|---|---|
| 3,007,527 | 11/1961 | Nelson | 137/493.9 |
| 5,622,484 | 4/1997 | Taylor-McCune et al. | 417/393 |
| 5,713,389 | 2/1998 | Wilson, Jr. et al. | 137/515.7 |

*Primary Examiner*—John Fox
*Attorney, Agent, or Firm*—Paul R. Puerner

[57] ABSTRACT

A water heater including a water-tight tank, a cold water inlet and a hot water inlet in the tank. A first heat trap assembly is mounted at the cold water inlet and a second heat trap assembly is mounted at the hot water outlet. The first and second heat trap assemblies are adapted to allow flow of water both into and out of the tank when hot water is drawn out of the hot water outlet. The first and second heat trap assemblies are adapted to reduce convection heat loss from inside the tank when the water heater is in a stable condition, i.e., when water is not being drawn out of the hot water outlet. The heat trap assemblies are comprised of a housing member having a flange and a cylindrical body formed integrally therewith and a bushing member having a flange and a cylindrical body formed integrally therewith. The body of the bushing member is securely mounted inside the body portion of the housing member. A flapper valve member having a central flapper section and an outside ring section is secured between the flanges of the housing member and the flange of the bushing member. The central flapper section of the flapper valve member is movable with respect to the ring section of the flapper valve member in response to a pressure differential across the first and second heat trap assemblies.

8 Claims, 3 Drawing Sheets

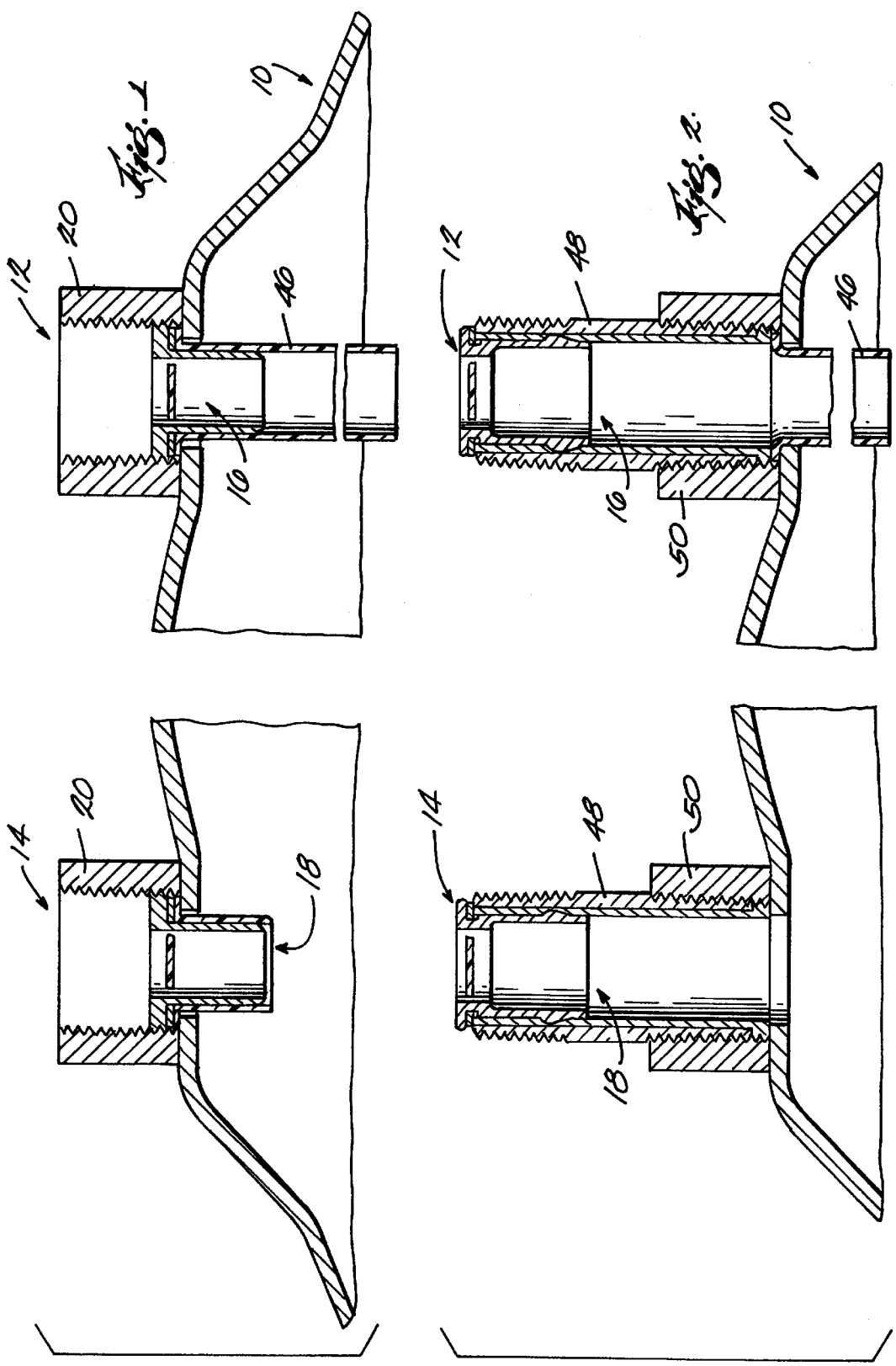

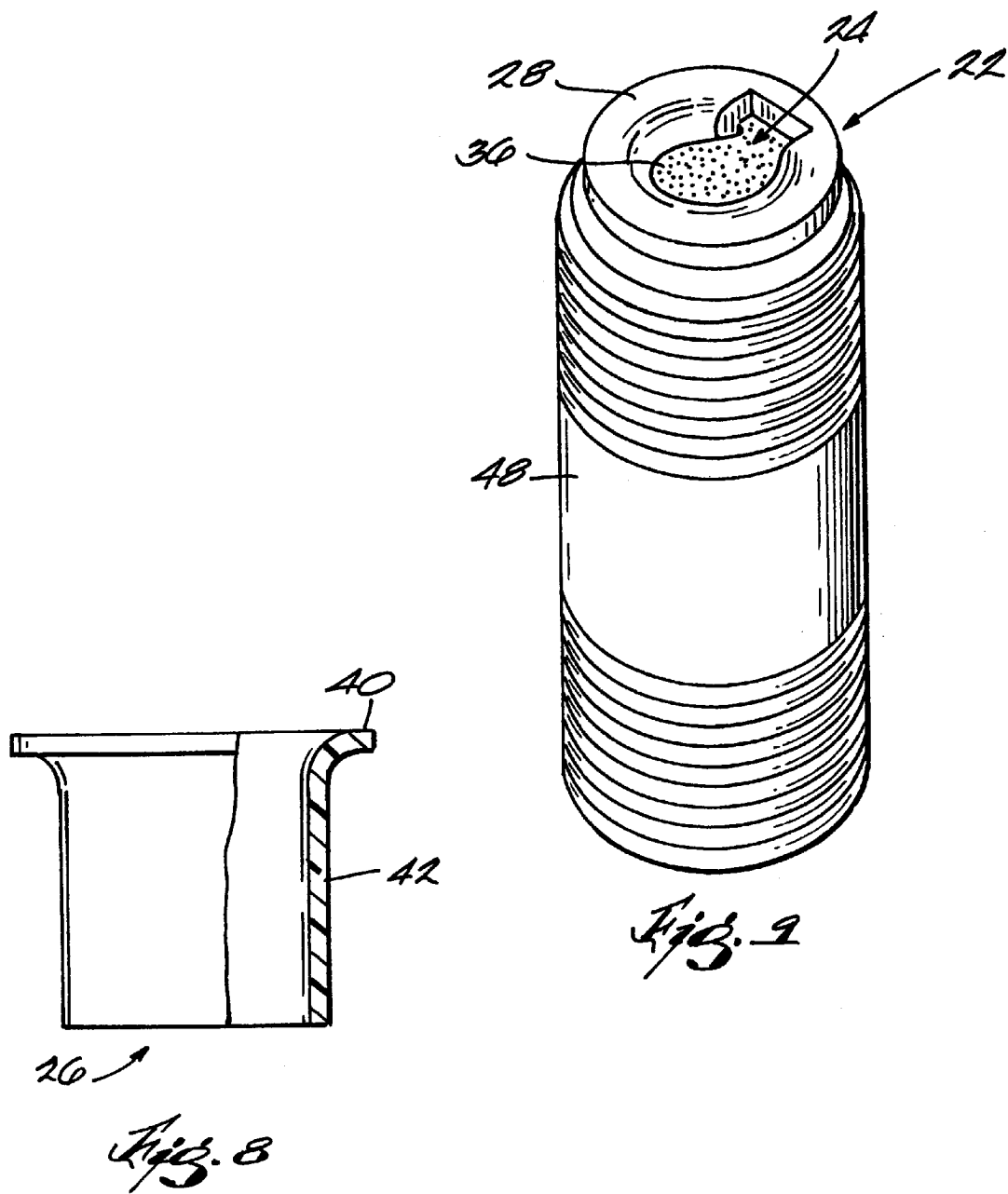

CONVECTION HEAT TRAP

CROSS-REFERENCE TO RELATED APPLICATION

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

While the present invention has useful application in a variety of fluid systems, it was particularly designed for use in a storage-type water heater.

In such applications, it is important that heat losses both at the cold inlet and hot outlet of the water heater tank be kept to a minimum when the water heater is in a stable condition, i.e., water is not being drawn into or out of the tank. On the other hand, it is important that when water is drawn out of the hot outlet, the flow of water into the cold inlet and out of the hot outlet be substantially unimpeded by the heat trap of the present invention.

BRIEF SUMMARY OF THE INVENTION

A heat trap assembly including a housing member having a flange portion and a cylindrical body portion formed integrally therewith. A bushing member having a flange portion and a cylindrical body portion formed integrally therewith with the body portion of the bushing member inserted into the body portion of the housing member. A flapper valve member having a central flapper section and an outside ring section fastened to the central flapper section. The ring section is secured between the flange portion of the housing member and the flange portion of the bushing member. The central flapper section of the flapper valve member is movable with respect to the ring section of the flapper valve member.

The housing member and the bushing member are made of plastic material. The central flapper section of the flapper valve member and the outside ring section of the flapper valve member are formed integrally with each other. The flapper valve member is made of a flexible material. A first heat trap assembly is mounted at the cold water inlet of a water heater storage tank. A second heat trap assembly is mounted at the hot water outlet of a water heater storage tank. The first and second heat trap assemblies will allow flow of water both into and out of the tank when hot water is drawn out of the hot water outlet. The first and second heat trap assemblies will reduce convection heat loss from inside the tank when the water heater is in a stable condition, i.e., when hot water is not being drawn out of the hot water outlet.

BRIEF DESCRIPTION OF THE SEVERAL VIEWS OF THE INVENTION

FIG. 1 is a partially schematic sectional view of the top portion of a water heater tank having heat trap assembly units mounted in the cold water inlet and the hot water outlet;

FIG. 2 is a partially schematic sectional view of the top portion of a water heater tank having a second embodiment of heat trap assembly units mounted in the cold water inlet and the hot water outlet;

FIG. 8 is a side elevation view of a heat trap housing member in which the heat trap bushing is mounted; and FIG. 9 is a perspective view of a heat trap assembly like that shown in FIG. 3 mounted in a pipe nipple.

DETAILED DESCRIPTION OF THE INVENTION

Figure 3:
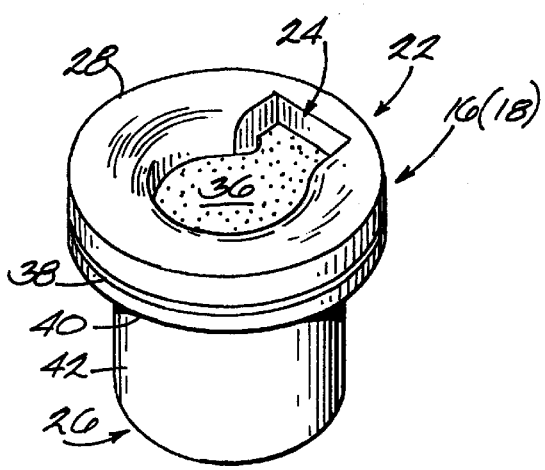
FIG. 3 is a perspective view of a heat trap assembly adapted for drop-in installation in the hot water outlet of a water heater.

The usefulness of the present invention may express itself in different applications. It is particularly designed for use in a storage-type water heater. It will therefore be described hereinafter in such an environment.

FIGS. 1 and 2 are partially schematic views of the upper portion of a storage-type water heater in which the heat trap assemblies of the present invention are installed.

Referring first to FIG. 1, reference numeral 10 is the upper portion of a water heater tank having a cold water inlet 12 and a hot water outlet 14 mounted in the tank top. A heat trap assembly 16 is mounted at the cold water inlet 12 and a heat trap assembly 18 is mounted at the hot water outlet 14. Assemblies 16, 18 are of identical construction. Internally threaded spud members 20 are mounted (by welding) at the cold inlet 12 and hot outlet 14 to provide for a threaded connection to exterior piping (not shown).

The heat trap assembly mounting arrangements shown in FIG. 1 contemplates mounting the heat trap assemblies in the tank at the time the water heater is manufactured.

Figure 6:
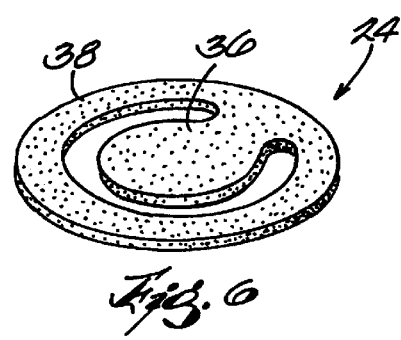
FIG. 6 is a perspective view of a flexible valve member adapted for mounting in the heat trap housing shown in FIG. 7.
Figure 7:
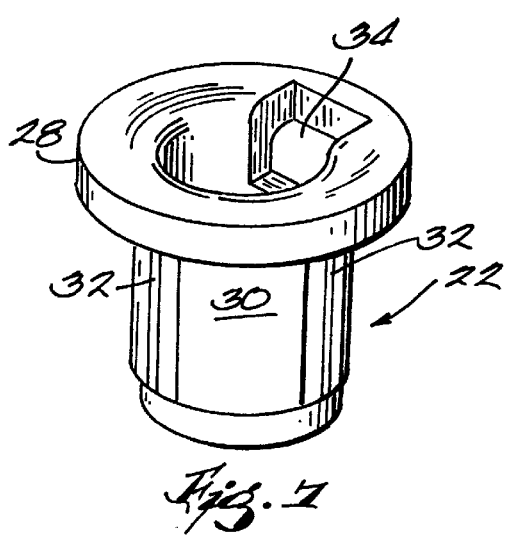
FIG. 7 is a perspective view of a heat trap bushing in which the flexible valve member shown in FIG. 6 is mounted.

A more detailed view of heat trap assemblies 16 and 18 is shown in FIGS. 6, 7 and 8. The assemblies 16 and 18 are comprised of a bushing member 22 (FIG. 7), a flapper valve member 24 (FIG. 6) and a housing member 26 (FIG. 8). Bushing 22 is comprised of a flange 28 and a cylindrical body portion 30 formed integrally with the flange. Body 30 has a plurality of circumferentially spaced raised ribs 32 formed thereon. A window 34 is provided in the side of body 30 and extends up into flange 28. Bushing 22 is made from any suitable plastic material such as cross-linked polyethylene. As indicated above, assemblies 16 and 18 are of identical construction.

Flapper valve member 24 (FIG. 6) is comprised of a central flapper section 36 and an outside ring section 38 formed integrally with the valve section 36. Flapper valve member 24 is made from any suitable flexible material such as 70 Duro EPDM rubber.

Housing 26 (FIG. 8) is comprised of a flange portion 40 and a tubular body portion 42 formed integrally therewith. Housing 26 is made from any suitable plastic material such as cross-linked polyethylene.

The first step in the assembly of parts 22, 24, 26 is to install the flapper valve member 24 in bushing 22. This is accomplished by folding the sides of valve section 36 together so that section 36 can be inserted through window 34 (FIG. 7) in bushing 22. The ring section 38 of valve member 24 is then stretched over the top of bushing flange 28 to a position directly beneath the flange.

The subassembly of parts 22 and 24 is then installed in housing 26 by pressing body 30 of bushing 22 into the body portion 42 of housing 26. The friction between ribs 32 on bushing 22 and the internal surface of body portion 42 of housing 26 will serve to securely maintain bushing 22 in housing 26.

Figure 4:
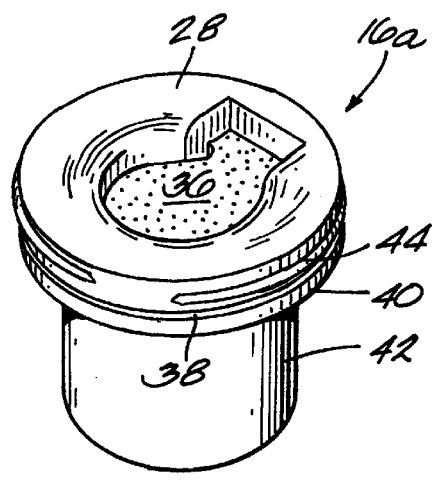
FIG. 4 is a perspective view of a heat trap assembly adapted for screw-in installation in the hot water outlet of a water heater.
Figure 5:
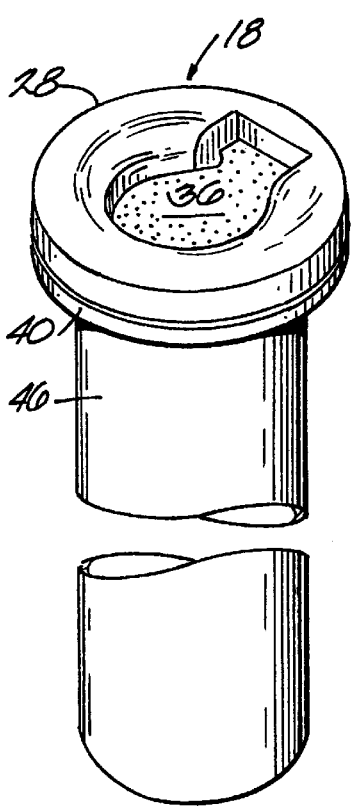
FIG. 5 is a perspective view of a heat trap assembly adapted for installation in the cold water inlet dip tube of a water heater.

Referring now to FIGS. 3, 4 and 5, FIG. 3 shows a heat trap assembly 18 comprised of the parts shown in FIGS. 6, 7 and 8; namely, a flapper valve member 24, a bushing 22 and a housing 26. As explained above, the bushing is pressed into housing 26 and thus the bushing flange 28 is the only part of the bushing shown in FIG. 3.

The heat trap assembly 16a shown in FIG. 4 is identical to the FIG. 3 assembly with one exception. Assembly 16a has threads 44 formed on the side of bushing flange 28 so that the bushing 16a can be threaded into a spud member 20.

In the FIG. 1 embodiment, the heat trap assembly 16 and the dip tube 46 are installed by simply dropping the tube 46 first and then the assembly 16 through the cold inlet spud 20 at the manufacturing site. The parts are securely retained in assembled position in the field by the installation of a connector nipple, not shown.

Also in the FIG. 1 embodiment, the heat trap assembly 18 at the hot outlet 14 is simply dropped through the spud 20 at the hot outlet at the manufacturing site. The assembly 18 is securely retained in place in the field by the installation of a connector nipple, not shown.

Referring now to FIGS. 2 and 9, an alternative arrangement for mounting the heat trap assemblies is shown. In the FIG. 2 arrangement, the heat trap assemblies 16 and 18 are pressed into pipe nipples 48 as shown in FIGS. 2 and 9. Pipe nipples 48 are threaded into spuds 50 which are welded to the top of tank 10 when the water heater is manufactured. This arrangement contemplates installing the heat trap assemblies 16 and 18 (and nipples 48) in the field as opposed to installation during the water heater manufacture as in the FIG. 1 embodiment.

HEAT TRAP OPERATION

First it is noted that the diameter of the valve section 36 of flapper valve member 24 is slightly smaller than the inside diameter of bushing 22. Thus, the section 36 of valve 24 is free to move (open) in response to a pressure differential across the flapper valve 24.

Thus, when a stable condition exists in the operation of the water heater, i.e., no flow either into or out of the tank, the valve 24 functions to restrict convection currents from flowing either into or out of the tank. Heat losses, which would occur absent the installation of the heat traps, are thereby reduced.

It follows that when a pressure differential is produced at the heat trap assemblies 16 and 18, i.e., when hot water is drawn from the tank 10, the flapper valves will open to allow flow of water both into and out of tank 10.

While the invention herein has been shown and described in what is presently conceived to be the most practical preferred embodiment, it will be obvious to one of ordinary skill in the art that many modifications may be made thereof within the scope of the invention, which scope is not to be limited except by the appended claims.

What is claimed is:

1. A heat trap assembly comprising:

a housing member having a flange portion and a cylindrical body portion formed integrally therewith;

a bushing member having a flange portion and a cylindrical body portion formed integrally therewith, said body portion of said bushing member inserted into said body portion of said housing member; and a flapper valve member having a central flapper section and an outside ring section fastened to said central flapper section, said ring section secured between said flange portion of said housing member and said flange portion of said bushing member, said central flapper section of said flapper valve member movable with respect to said ring section of said flapper valve member.

2. A heat trap assembly according to claim 1 in which said housing member and said bushing member are made of a plastic material.

3. A heat trap assembly according to claim 2 in which the plastic material is cross-linked polyethylene.

4. A heat trap assembly according to claim 1 in which said central flapper section of said flapper valve member and said outside ring section of said flapper valve member are formed integrally with each other.

5. A heat trap assembly according to claim 4 in which said flapper valve member is made of a flexible material.

6. A heat trap assembly according to claim 5 in which said flexible material is 70 Duro EPDM rubber.

7. A heat trap assembly according to claim 5 in which the side of said bushing member has a window therein through which the central flapper section of said flapper valve member is inserted when the flapper valve member is mounted on said bushing member.

8. A heat trap assembly according to claim 1 in which said body portion of said bushing member has a plurality of circumferentially spaced raised ribs formed thereon.

\* \* \* \* \*